United States Patent [19]

Cavalli

[11] Patent Number: 4,664,529
[45] Date of Patent: May 12, 1987

[54] ICECREAM-MAKING HOUSEHOLD APPLIANCE INCORPORATING AN AUTOMATIC STIRRING PADDLE STOPPING DEVICE

[76] Inventor: Alfredo Cavalli, Via Galileo Galilei 9, Pessano con Bornago (Milano-Italy), Italy

[21] Appl. No.: 733,803

[22] Filed: May 14, 1985

[30] Foreign Application Priority Data

May 15, 1984 [IT] Italy ................... 20924 A/84

[51] Int. Cl.⁴ ............................................. A23G 9/00
[52] U.S. Cl. .................................... 366/149; 62/342; 99/455; 366/144; 366/601
[58] Field of Search ............. 366/144, 142, 145, 149, 366/601; 62/342, 135, 343, 136; 99/452, 453, 455; 318/325, 327

[56] References Cited

U.S. PATENT DOCUMENTS

| | | | |
|---|---|---|---|
| 2,511,313 | 6/1950 | Yohe | 366/601 X |
| 3,898,858 | 8/1975 | Erickson | 62/342 |
| 4,450,692 | 5/1984 | Sharpe et al. | 62/342 X |
| 4,463,572 | 8/1984 | Brown, Jr. | 366/144 |
| 4,545,216 | 10/1985 | Cavalli | 62/343 |
| 4,551,025 | 11/1985 | Ames et al. | 366/144 |
| 4,551,026 | 11/1985 | Cristante | 366/149 |
| 4,568,193 | 2/1986 | Contri et al. | 366/601 X |

*Primary Examiner*—Timothy F. Simone
*Attorney, Agent, or Firm*—Fleit, Jacobson, Cohn & Price

[57] ABSTRACT

The household appliance disclosed comprises an icecreaming vessel wherein an icecreaming paddle is active which is driven by an electric motor and a device for automatically stopping the action of the paddle. That device includes means of sensing the icecream consistency by measuring the electric current drawn by the electric motor. Such means are operative to drive a switch element in the supply circuit to the electric motor to open on reaching a preset current value.

5 Claims, 2 Drawing Figures

ICECREAM-MAKING HOUSEHOLD APPLIANCE INCORPORATING AN AUTOMATIC STIRRING PADDLE STOPPING DEVICE

BACKGROUND

This invention relates to an icecream-making appliance for domestic use which comprises an icecreaming vessel, an icecreaming paddle driven by an electric motor and operative within said icecreaming vessel, and a device effective to discontinue the mechanical action of said paddle automatically.

In icecream making machines, the mechanical action of the paddle must be stopped as soon as the icecream is completed; as is known, icecream is to be regarded as completed on its achieving a certain consistency (or viscosity), which may differ according to the type of the icecream and individual consumer's taste.

If the machine is stopped prematurely, the icecream will show poor consistency (incomplete icecreaming) and hence, be of inferior quality. If, by contrast, the machine is stopped too late, the quality of the icecream remains unaffected, but the mechanical components, and the paddle motor especially, are subjected to unnecessary and objectionable stresses, while valuable electric power is wasted. As is apparent, the latter situation would be met virtually each time that icecream is prepared upon re-starting the machine on account of incomplete icecreaming.

In an attempt to solve this problem, some devices have been proposed and used.

One of these prior devices provides for the use, for example, of an icecreaming paddle having tiltable working portions, the tilting movement of said working portions being controlled by spring mechanisms.

On the paddle meeting a preset mechanical resistance, the working portions thereof are tilted into an inoperative position, usually outward of the icecream mass. Such devices reduce the unnecessary stresses and waste of power (the motor continuing to turn, but under a reduced load, and hence, at a reduced rate of electric power consumption). However, they are not devoid of some well-recognised disadvantages, the most important of which is the need for calibrating the spring mechanisms which control the tilting movement. As is well known in the art, that calibration is a fairly critical and difficult operation, and is generally factory set without allowance for manipulation by the user; it may be appreciated that this approach restricts the choice of the icecream consistency which is more appropriate in each case. In addition, incidental external factors (such as the ageing of parts) may change in an uncontrollable manner the time when the consistency of the icecream mass causes the working portions of the icecreaming paddle to tilt out.

Other devices included are timers by means of which a given period of operation can be preset. At the end of that period, the paddle is stopped by disengagement from the motor, which continues instead to be operated.

The above period of operation should be selected based upon previous experience (either made directly by the user or by the manufacturer and tabulated in special recipe books), and is of necessity a rough approximation since it cannot take into account such random events as temperature, humidity, granulometry, and hardness of the water. Further, in the instance of some novel recipe being attempted, the tested values require to be extrapolated, which introduces well recognized factors of uncertainty connected with this type of operation. Thus, it often happens that the set period of time be either too short or too long, thereby the cited problems (mechanical stresses, power consumption) are at most attenuated, but surely not eliminated.

Accordingly, still unsolved is the problem of providing an icecream-making apparatus which incorporates a stop device effective to cut in at the exact time when the icecream is ready, i.e. on its reaching the consistency sought by the user.

SUMMARY OF THE INVENTION

This invention is directed to solve that problem, and the object is achieved by an icecream-making household appliance comprising an icecreaming vessel, an icecreaming paddle driven by an electric motor and active in said icecreaming vessel, characterised in that it comprises a device for automatically stopping the mechanical action of said paddle and including means of sensing the icecream consistency by measuring the electric current input to said electric motor and of turning off a switch element in the power circuit to said electric motor on the input current reaching a preset value.

BRIEF DESCRIPTION OF THE DRAWINGS

The features and advantages of an appliance according to the invention will be apparent from the following description of a preferred embodiment thereof, with reference to the accompanying drawings. In the drawings.

DETAILED DESCRIPTION

Figure 1:
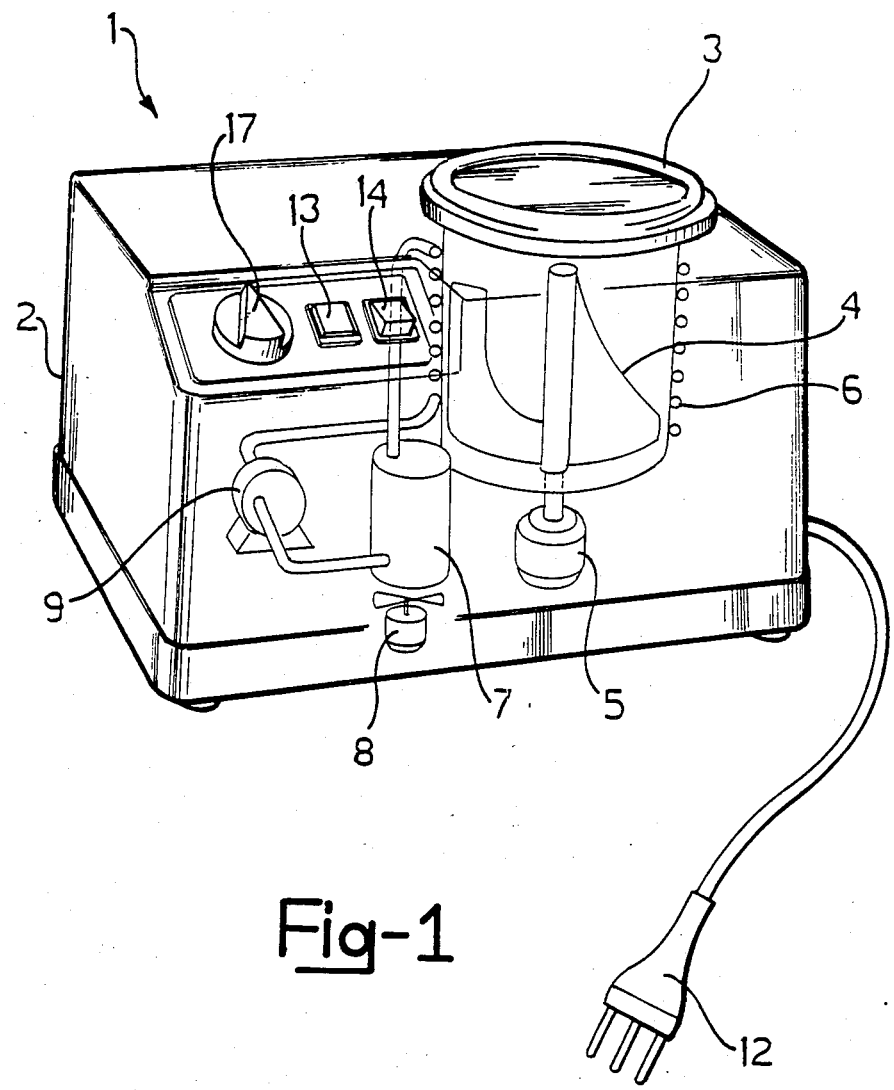
FIG. 1 is a ghost-line perspective view showing schematically an appliance according to the invention.

In the drawing figures, the numeral 1 generally designates a household appliance for icecream making. It comprises a box-type body 2 which supports a cylindrical icecreaming vessel 3, wherein an icecreaming paddle 4 is active which is driven by an electric motor 5 mounted in the body 2.

The appliance 1 also comprises a refrigerating system for cooling the vessel 3; the refrigerating system includes an evaporator 6 encircling the vessel 3, a condenser 7 and related cooling fan 8, and a compressor 9.

The appliance 1 further comprises a power supply circuit of which a first power line 10 to the motor 5 and a second power line 11 to the fan 8 and compressor 9 are shown schematically. The lines 10 and 11 are terminated with a common plug 12 and provided with respective switches 13 and 14 carried on the box-type body 2.

The line 10 also includes a switch element controlled by an electronic channel sensing the electric current input to the motor 5.

Figure 2:
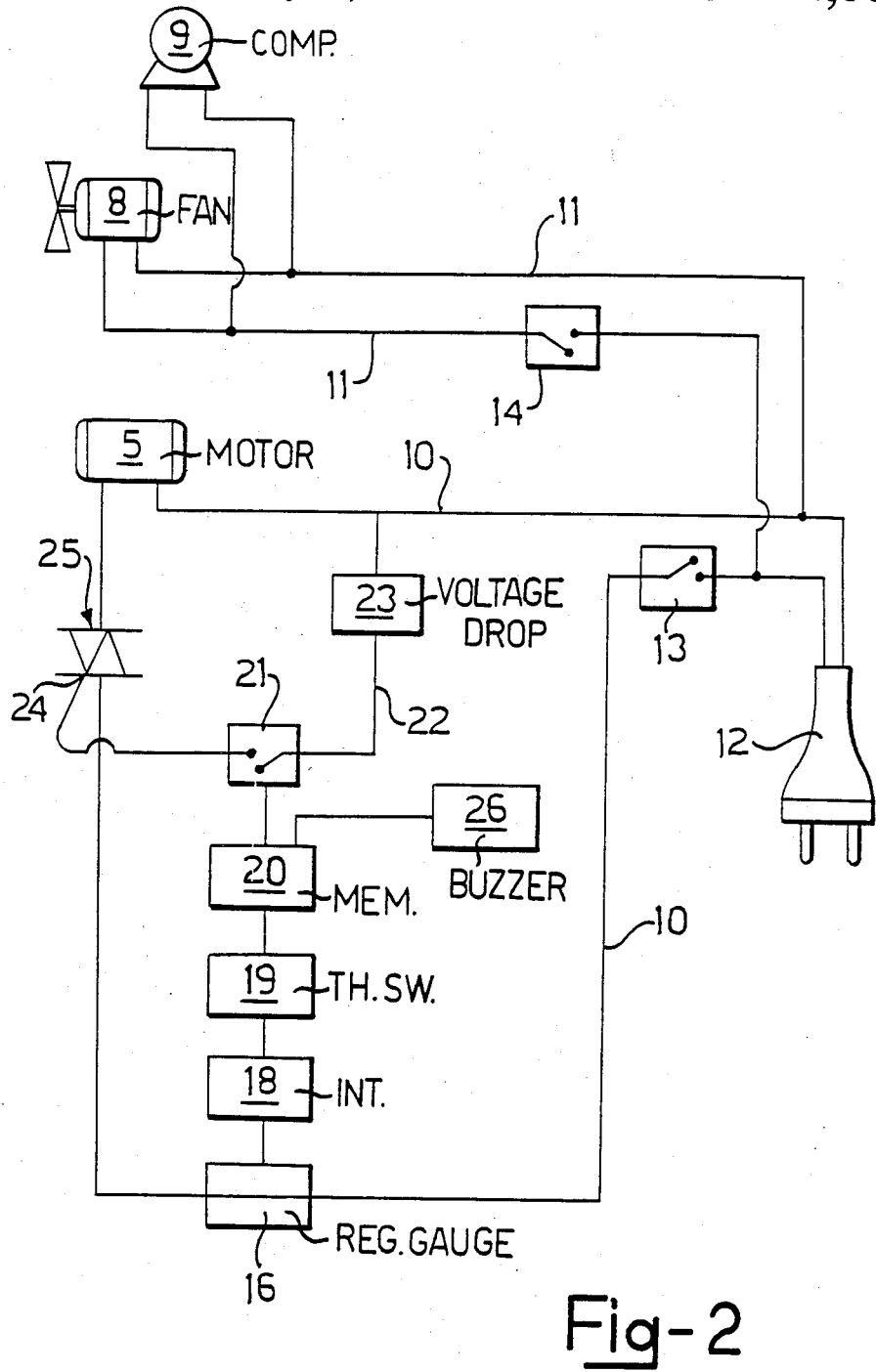
FIG. 2 is a block diagram of the electric power supply circuit for the appliance of FIG. 1.

More specifically, the electronic channel, illustrated by the block diagram of FIG. 2, comprises a regulator gauge 16 wherethrough the full supply current to the motor 5 is flow and is adapted to generate a signal proportional thereto and to the position of a regulator 17.

The output signal from the regulator gauge 16 controls, via an integrator 18, a threshold switch 19; the threshold switch 19 only outputs a signal on the input signal reaching a definite preset level.

The signal output by the threshold switch 19 is stored in the memory 20, thereafter it will act on a logic switch 21. The switch 21 is arranged to act on a low tension line 22 derived from the line 10 by means of a voltage drop 23; the line 22 supplies, through the switch 21, a current to the control terminal 24 of a TRIAC 25 included to the line 10 which forms the aforesaid switch element. The TRIAC 25, as is known, is an electronic component which behaves like a controlled switch, it being closed while no power is supplied to its control terminal 24 and open as its terminal 24 is alive. The low tension line 22 also powers all of the electronic blocks shown, in a conventional fashion not illustrated.

Advantageously, an electronic buzzer 26 is also provided which is controlled by the output signal from the memory 20.

The operation of this appliance will be now described with reference to FIGS. 1 and 2.

To prepare icecream, the vessel 3 is first cooled by energising through the switch 14 the electric power supply line 11 to the compressor 9 and fan 8 of the condenser 7. Once the vessel 3 is cooled, the ingredients are introduced thereinto and the icecreaming paddle 4 is started by energising the electric line 10 to the motor 5 through the switch 13. At this stage of the operation, the TRIAC 25 will behave as a closed switch, admitting current to the motor 5.

As stirring and cooling continue, the icecream ingredients will form an increasingly more consistent composition which opposes the rotational movement of the paddle 4 with an increasingly greater mechanical resistance. As the resisting torque increases, the electric motor 5 reacts by drawing more current from the line 10.

Thus, the output signal from the regulator gauge 16 becomes simultaneously stronger; at a certain point, that signal (as suitably interfaced by the integrator 18 to prevent isolated and randomly occurring current peaks form causing false operations) will reach a sufficient level to trigger the threshold switch 19. The level of the input signal to the threshold switch 19 will depend, therefore, on the consistency of the icecream and the position of the regulator 17, that is, for each position of the regulator 17 there corresponds a different consistency of the icecream at which the threshold switch 19 is triggered.

The triggering on of the threshold switch 19 causes a signal to be supplied to the memory 20 which, after storing it, will pass it to the logic switch 21, thus closing the low tension line 22. Thus, the terminal 24 is energised to open the TRIAC 25, and the motor 5 is de-energised and the paddle 4 brought to a stop. The break on the line 10 puts an end to the outputting of signals from the threshold switch 19, but the logic switch 21 is held closed by the signal stored earlier in the memory 20.

Simultaneously with the control of the TRIAC 25 to open, the memory 20 also activates the electronic buzzer 26 that warns the user that the icecream is ready. No automatic operation is provided on the line 11 to the refrigerating system because the refrigeration must not be discontinued.

To interrupt the operation of the buzzer 26, it will be sufficient to move the switch 13 to the open position. The opening of the switch 13 also causes the clearing of all the signals from the electronic blocks, including the signal stored in the memory 20. On subsequent closing of the switch 13, the original conditions are automatically restored.

With the appliance of this invention, the user is enabled to select each time a preferred consistency of the icecream.

To that end, it will be sufficient for him/her to manipulate the regulator 17; in order to facilitate this operation, the regulator 17 may be advantageously provided with a calibrated scale (not shown). The stirring paddle will stop automatically on reaching the desired icecream consistency.

Thus, the problem expounded in the preamble to this description (that of stopping automatically the appliance when the icecream is ready) is fully solved. An always perfect icecream is thus obtained for a minimal consumption of power and without unduly stressing the appliance mechanically.

I claim:

1. An ice-cream making household appliance comprising a box-type body, an ice-creaming vessel supported in a side body, an electric motor mounted in the box-type body, an ice-creaming paddle settled in said ice-creaming vessel and driven by said electric motor, an electric power supply circuit including a power line for energizing said electric motor by a current, a switch element in said power line, sensing means to measure said current and control said switch element when said current reaches a predetermined value.

2. A household appliance according to claim 1, wherein said sensing means include:
   a regulator gauge wherethrough said current to said motor is caused to flow and which generates a signal proportional to said current and to a setting of a regulator therein,
   an integrator for interfacing and integrating said signal from said regulator gauge,
   a threshold switch adapted to supply a threshold signal upon the integrated signal reaching a preset value,
   a memory adapted to transfer and store the threshold signal from the threshold switch, and
   a logic switch controlled by said memory and in turn controlling the power line to said electric motor via said switch element.

3. A household appliance according to claim 2, wherein said switch element is a TRIAC whose control terminal is energized through said logic switch.

4. A household appliance according to claim 2 including an electronic buzzer controlled by said memory.

5. A household appliance according to claim 1 wherein the level of said current supplied to said electric motor is representative of the consistency of ice-cream ingredients placed in said ice-creaming vessel and said ice-creaming vessel includes a controllable refrigeration means therefor.

* * * * *